(12) United States Patent
Ramanathan et al.

(10) Patent No.: US 8,266,002 B2
(45) Date of Patent: Sep. 11, 2012

(54) SYSTEM OF FACILITATING A SALES TRANSACTION BETWEEN A BUYING GROUP AND MULTIPLE SELLERS OVER AND ELECTRONIC NETWORK

(76) Inventors: Ramanathan Ramanathan, University Place, WA (US); Qinsheng Huang, Camas, WA (US); Edward Leonard Herinckx, Camas, WA (US)

(*) Notice: Subject to any disclaimer, the term of this patent is extended or adjusted under 35 U.S.C. 154(b) by 598 days.

(21) Appl. No.: 12/456,066

(22) Filed: Jun. 10, 2009

(65) Prior Publication Data
US 2010/0318435 A1    Dec. 16, 2010

(51) Int. Cl.
*G06Q 30/00* (2012.01)
(52) U.S. Cl. .............. 705/26.1; 705/27.1; 705/26.3
(58) Field of Classification Search .......... 705/26, 705/27, 26.1, 26.3, 27.1
See application file for complete search history.

(56) References Cited

U.S. PATENT DOCUMENTS

| | | | |
|---|---|---|---|
| 7,146,330 B1 | 12/2006 | Alon | |
| 2007/0027792 A1* | 2/2007 | Smith | 705/37 |
| 2009/0125414 A1* | 5/2009 | Kleinrock et al. | 705/26 |

OTHER PUBLICATIONS

"AbsoluteBuyer.com Revolutionizes Reverse Auction Buying" (Anonymous. Life Science Weekly. Atlanta: Feb 17, 2009. p. 3558).*
US 6,047,266, 04/2000, Van Horn (withdrawn)

* cited by examiner

*Primary Examiner* — Jeffrey A Smith
*Assistant Examiner* — Courtney Stopp
(74) *Attorney, Agent, or Firm* — Mark S. Hubert

(57) ABSTRACT

A system to facilitate the interaction of a group of buyers and a group of sellers through a transaction network, such as the internet, is disclosed. A buyer may start a buying group or join an existing group for purchasing a product or service. During the life cycle of a buying group, buyers are encouraged to invite other buyers to join the group via email, blog, social networking websites, or other means, thereby increasing the purchasing power of that group. Once a buying group has been established, sellers can compete for the volume sale. Sellers may review the bid price submitted by other sellers and submit competing bids. Once the bid cycle closes this system will automatically match the buyers and sellers based on a variety of factors including the order each buyer entered his or her purchase intent, each buyer's maximum price, each seller's bidding price, the quantity each seller can provide, and the order of each seller's bid. At the end of the matching, one or more sellers may fulfill a single group order.

2 Claims, 3 Drawing Sheets

SYSTEM OF FACILITATING A SALES TRANSACTION BETWEEN A BUYING GROUP AND MULTIPLE SELLERS OVER AND ELECTRONIC NETWORK

BACKGROUND OF THE INVENTION

The present invention relates to demand aggregation for goods and services through a dynamic pricing mechanism in which, over an electronic network, such as the Internet, consumers can form buying groups to leverage their buying power and have sellers compete to fulfill their order. Once the bidding cycle has ceased a system for facilitating the sales transaction automatically matches the buyers and sellers based on a variety of factors.

Almost everyone is familiar with these dynamic pricing mechanisms offered by such companies as eBay (www.ebay.com) and uBid (www.ubid.com), where consumers actively place bids, and the final transaction price is the highest price offered at the end of a bidding cycle. More recently, companies such as Priceline (www.priceline.com) and Hot-Wire (www.hotwire.com), allow a single buyer to name the maximum, binding price he is willing to pay, and Priceline or Hotwire then, acting as the seller, either accepts or declines the buyer's binding price. The buyer can never achieve a price less than the binding price he initially offered.

Less familiar to most consumers is the special instance of dynamic volume pricing mechanisms offered by group buying, where discounts are felt when prices fall as a result of the savings a seller can often offer in the presence of many buyers of the same product. Historically, group buying web sites offered by such companies as Mercata (www.mercata.com) and Mobshop (www.mobshop.com) employed a predetermined price change trajectory (i.e., how much and when a discount will be felt is set before the auction cycle begins), that in Mobshop's case was revealed to consumers, while not revealed in the case of Mercata. As the total quantity of the offered product increased during the purchase period, the price paid by each buyer decreased, according to the predetermined price trajectory.

Mercata actually stocked the inventory it offered for sale and ultimately failed because it had to anticipate consumer demand—purchasing and inventorying appropriate levels of merchandise, which proved to be an overwhelming task. Mobshop did not stock merchandise. Instead, Mobshop pre-negotiated volume discount prices with suppliers, and served as an intermediary, asking the suppliers in which pre-negotiated volume discounts had been brokered to fulfill the orders of the buying groups on their website. While Mobshop was able to save on overhead by not stocking inventory, it still had the problem of anticipating demand, and getting suppliers to agree to aggressive pricing, when Mobshop could not guarantee a committed group of consumers. Additionally, neither Mercata nor Mobshop could guarantee the price consumers were receiving was competitive, since sellers were not bidding for the volume sale, but instead a predetermined price trajectory was employed, which ultimately was not designed to maximize the buyer's savings.

What is needed is a system to facilitate the interaction between a group of like-minded consumers with sellers, interested in bulk sales opportunities within the online marketplace, that does not heavily rely on anticipating consumer demand or on predetermined price trajectories. The present invention creates a virtual marketplace via a web-based application that allows buyers to collectively join together, aggregating demand, and allows sellers to actively compete for all, or a portion of, the volume sale. The invention will not rely on its own inventory, but instead act as an exchange, minimizing operating costs and, through social media, the present invention can target existing affinity groups, as well as potential vendors.

SUMMARY OF THE INVENTION

To combat the above identified shortcomings the first aspect of the invention is a system, implemented via a computer or handheld mobile device, to facilitate the grouping of like-minded buyers based on purchase characteristics through an electronic network.

Once a group of buyers who share the same purchase characteristics is formed and stored in the computer system, a second aspect of the invention employs reverse auction methodology, facilitating the interactive bidding of sellers to the group of buyers.

Thirdly, the invention provides a means for buyers to recruit other potential buyers through social media utilities.

Fourthly, the invention still further provides a computer-readable data transmission medium containing a data structure that facilitates a sales transaction with both the seller and the buyer, in which the data transmissions sent to the seller varies from the data transmissions provided to the buyer.

Fifthly, the invention further provides a system to balance the buyers' commitment to buy and sellers' motivation to bid and therefore reduces the price the buyers ultimately pay.

The invention still further provides a system to automatically match the buyers and sellers based on a variety of factors, potentially resulting in more than one seller fulfilling a single group order.

DETAILED DESCRIPTION

Reference will now be made in detail to embodiments consistent with the present invention, a system for facilitating a sales transaction between multiple buyers and multiple sellers in an electronic marketplace, enabling potentially unrelated and/or related buyers to aggregate their purchases, creating a volume sales opportunity for multiple sellers, examples of which, are illustrated in the accompanying drawings.

The system utilizing a computer or mobile handheld device, for implementing the invention is via a web application accessed by buyers and sellers alike via the Internet—that is the global network of interconnected computers enabling users to share information along multiple channels.

Figure 1:
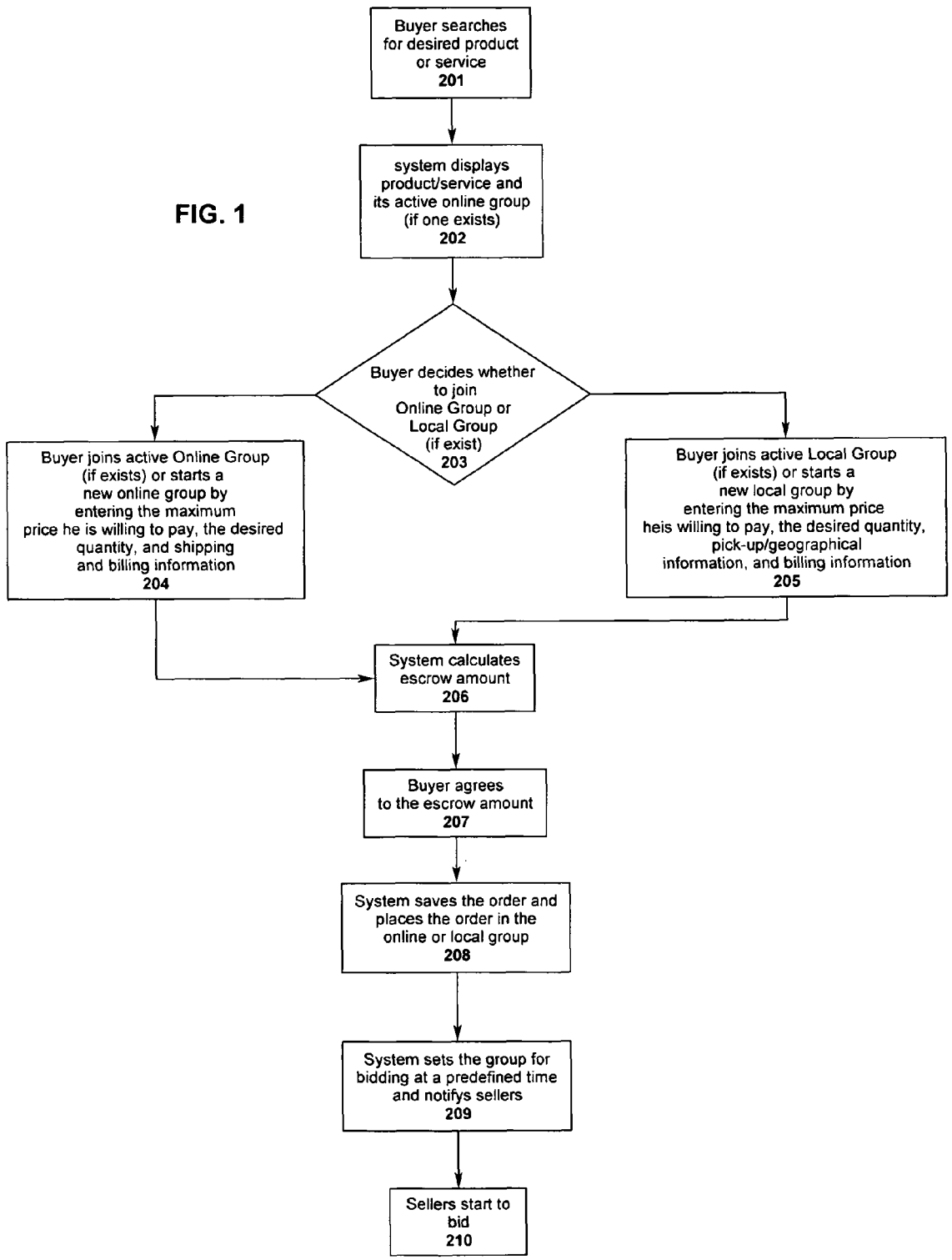
FIG. 1 is a block diagram for the formation of a buying group under an embodiment of the invention.

FIG. 1 is a block diagram illustrating the formation of a buying group, according to an embodiment of the invention. The buyer uses his computer to search or navigate for a desired product or service 201. Once the buyer has located a desired product or service, the buyer will be able to view specifics of each product/service, such as, but not limited to: size, weight, color, retail price, etc. Current group information will also be visible—that is whether a group(s) already exists which the buyer can join 202. The buyer now decides whether he would like to join one of two different group types, an Online Group or a Local Group. The Local Groups will be based on geography (such as zip code, metro area, etc.). Under the present invention if the buyer decides to join a Local Group, he will go to a local store (i.e. a store within his geographic region) to retrieve the purchased merchandise (or service). If the buyer joins an Online Group the purchased merchandise will be shipped directly to him. This novel feature allows smaller companies a potential competitive edge within their geographic region over larger companies, which typically have larger available inventories, since the shipping and handling of the purchased goods is omitted by joining a Local Group. The buyer joins (or starts) an Online Group by entering the maximum unit price he is willing to pay for a product/service, the desired quantity, and his shipping and billing information 204. Similarly, buyer joins (or starts) an Local Group by entering the maximum unit price he is willing to pay for a product/service, the desired quantity, his geographical area (metro area) for pick up for retrieval of the goods/services, and his billing information 205.

The act of submitting the commitment price 203 causes the buyer to either join an existing group or start a new Local Group 204 or start/join an Online Group 205. If the group does not exist, the system will automatically start a new group. Once a buyer joins/starts a Local Group 204 or an Online Group 205, the system calculates an escrow amount 206. Once the buyer agrees to the escrow amount and any terms and conditions 207, the system saves his order and places that order in the appropriate group (i.e., an existing Online Group, or an existing Local Group, a new Online Group, or a new Local Group) 208. At this time the system may or may not place a hold on the buyer's credit card for the escrow amount. Now the buying group is set for the auction cycle at a predetermined time, and sellers are notified 209. Bidding from the sellers can now begin 210.

An important aspect of an embodiment of this invention is the process by which the buyer joins the auction cycle (steps 201 through 208). Historically, in a reverse auction, where multiple sellers bid for a buyer's order, the seller has very limited motivation to bid early. Strategically, the seller wants to make only one bid; the last and lowest at the very end of the auction cycle thereby obtaining the volume sale for the entire group. However, if sellers wait to bid, buying groups remain small because buyers are not seeing lower and lower prices. Under an embodiment of the present invention, each buyer must commit to a maximum unit price he is willing to pay, which must be lower than a predetermined percentage of the retail price of the item, and agree to have a percentage of that maximum price held on his credit card as an escrow fee. What percentage of the retail price of the item is required by the system will vary depending on the product. For example, if the product is a "close out" item the percentage may be very low; however, if the item is a highly demanded gaming system the percentage could be quite high, even up to 100% of the retail price. If the buyer does not want the product for any reason after the auction cycle begins, and the cycle ends at a price below the buyer's maximum unit price, the buyer will be charged the escrow fee. This feature of the present invention allows sellers to know there are serious buyers; ridiculous or postured commitment prices are not accepted. Additionally, under an embodiment of this invention numerous sellers may fulfill one group order. For example, if a group is formed for 100 Big Bertha Diablo® Drivers, 5 different sellers, each supplying 20 drivers could complete the order. Since many sellers can potentially fill one order, it becomes optimal for a seller to bid early and bid low, since sellers themselves might be bumped from the queue of order fulfillment, as discussed below.

Figure 2:
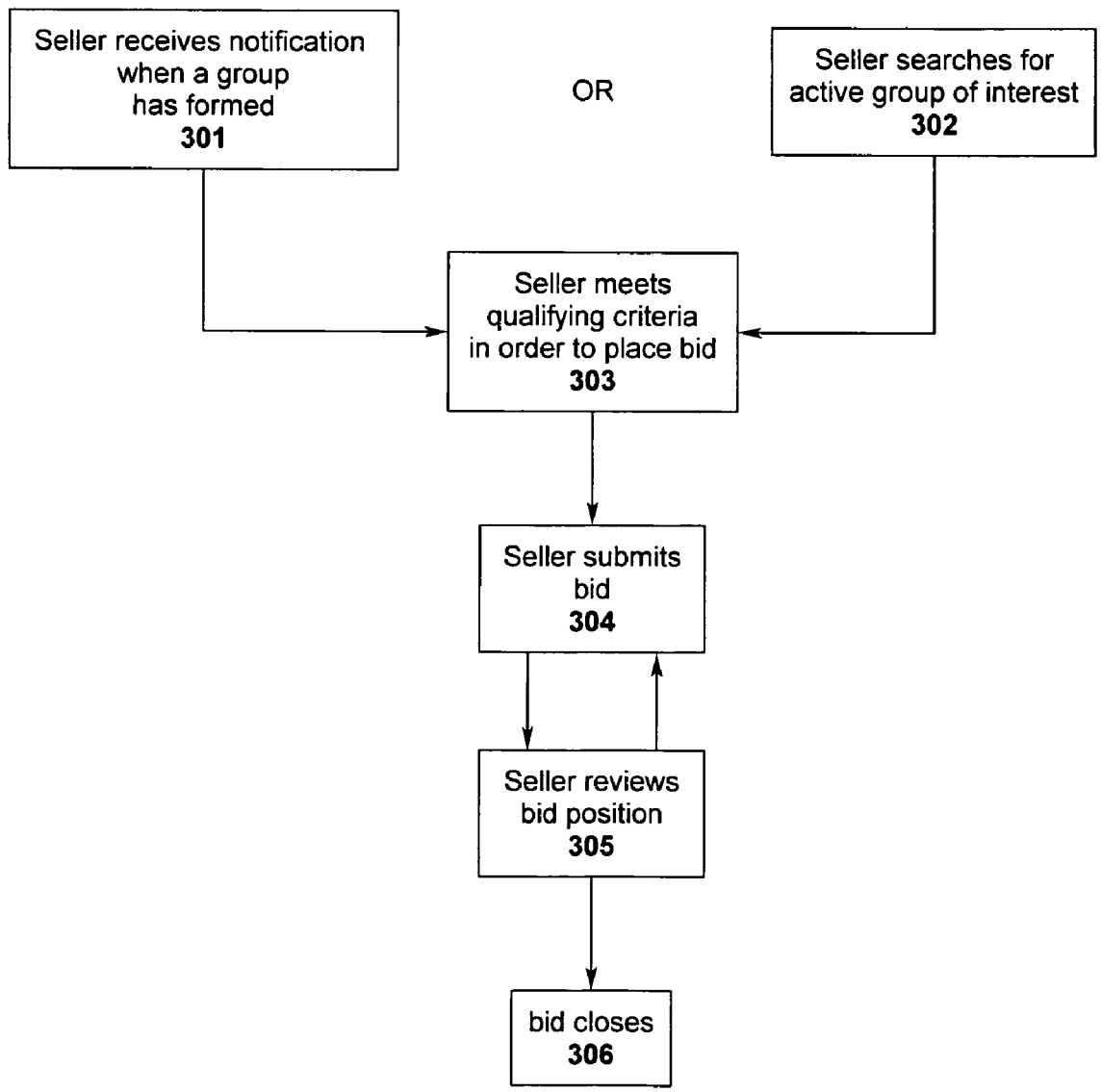
FIG. 2 is a block diagram for an auction cycle where sellers bid for a volume sale under an embodiment of the invention.

Sellers will begin bidding as soon as a group of buyers is formed 210. Looking now at FIG. 2 a block diagram of the reverse auction cycle in which the sellers bid can be seen. The sellers can either search for active groups of interest 302 or receive automatic notification via the system each time a relevant group is formed 301. The sellers can submit a bid at any time 304. Each seller will be required to enter the maximum and minimum quantity he is willing to sell for a given price. Sellers may review bids, but are provided with limited information. For example, sellers will be able to review the price, the maximum quantity, and the minimum quantity, submitted by other sellers and review the status of their own bid position, but will not know the identities of competing sellers 305. All of the sellers who are capable of fulfilling either a partial or complete order of the buyer group will compete with each other in lowering the price for that particular product/service, resulting in the lowest bid price, as indicated by the arrows between 304 and 305. The seller can revise the current bid into a better bid (e.g., lower price, lower minimum quantity, or increase the maximum quantity available for purchase). Once the predefined bidding close time is attained, the bidding is closed 306. If a seller does not fulfill his commitment for any reason, the seller is assessed a penalty, in which the system will take a percentage of the penalty, and the remaining amount will be forwarded to the buyer(s). To facilitate this process each seller will be required to provide credit card and/or billing information before that seller will be allowed to bid 303.

In an embodiment of the invention the system is designed such that buyers and sellers have different information available for review. Before an auction cycle begins each buyer is able to view the quantity and size of the group (to date) that the buyer has either joined or is considering joining, the time the auction cycle will start, and the time the auction cycle will close (or the remaining time if the auction cycle has already begun). Different groups (online and local groups) that have formed for the same item, will each have their own bidding price, group size, etc., and consequently, sellers can bid on each group independently. Once the auction cycle has begun the buyers will be able to view the lowest bid price, the size of the group, and the total quantity of the items the group is seeking.

In order to facilitate demand aggregation, the system allows and encourages buyers to recruit other buyers, which can be done before or during the bidding stage. Buyers can join the group until the auction cycle closes. Buyers will be able to quickly link to their email accounts and social networking sites such as www.myspace.com, www.facebook.com, and www.twitter.com, via icons easily accessible on the web application, making publishing of the group and product information extremely quick. For ease of use the system can store user profile information such as shipping address, credit card information, etc., in order to facilitate the checkout process for frequent users.

Sellers may view the auction cycle start time and close time (or the remaining time in the auction cycle if the auction cycle has already begun), the total quantity and group size history, and all current bids. Additionally, the system will perform a simulation of an auction closing process to give sellers estimated volume potentials.

Figure 3:
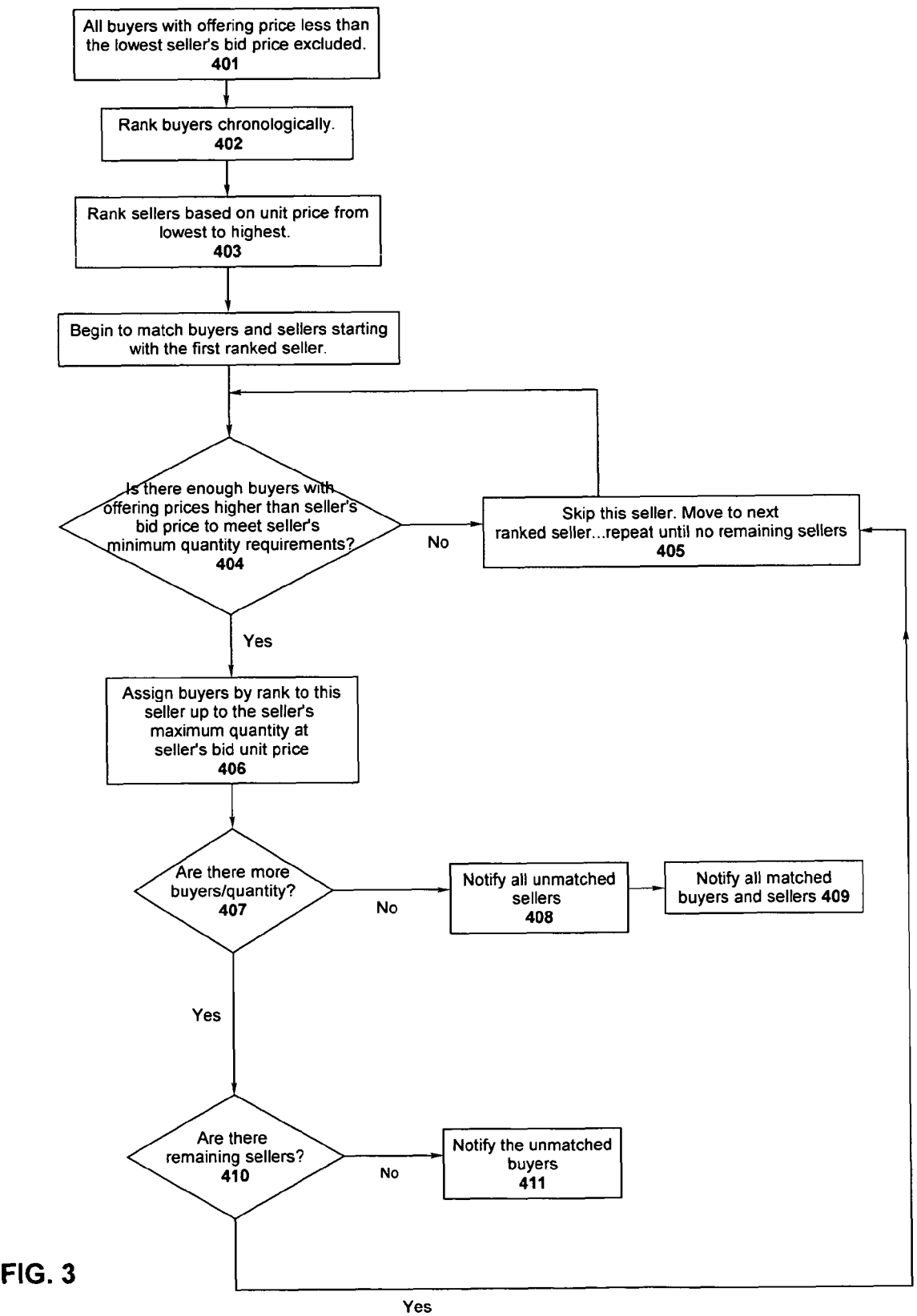
FIG. 3 is a block diagram for the system under an embodiment of the invention in which buyers and sellers are matched.

Once the auction cycle has closed, the system performs the matching of the buyers with the sellers, facilitating the sales transaction between the buyers and the sellers as shown in FIG. 3. Initially, all buyers with offering prices (maximum unit price the buyer is willing to pay) that are less than the lowest seller's bid price are excluded from the system 401. Buyers are sequenced chronologically, based on the order in which each buyer submitted his maximum unit price 402. The buyer that joins the buying group first is in the first position to receive the product at seller's bid price. Sellers are then sequenced based on their bid price from lowest to highest 403.

The system then determines if there are enough buyers (quantity) with offering prices greater than the top ranked (that is the seller with the lowest bid price) seller's bid price to meet seller's minimum quantity requirement 404. If there are enough buyers (quantity) with offering prices higher than seller's bid price to meet seller's minimum quantity requirements, buyers will be assigned to that seller, at the seller's bid unit price until the seller's maximum quantity is reached 406. If there are not enough buyers (quantity) to fulfill the seller's minimum quantity, the seller will be skipped 405 and the system returns to step 404, and evaluates the second ranked seller. The process of comparing the total quantity by the buying group to each successive seller (steps 404 and 405) is repeated until either the total quantity required is greater than or equal to the next ranked seller, or there are no more sellers, or the quantity required by the buyers reaches zero. Next the system checks if there are more unassigned buyers (quantity) 407. If there are no remaining buyers, the system notifies all unmatched sellers 408, and notifies all matched buyers and sellers 409. If remaining buyers are found, the system checks for remaining sellers 410. If there are remaining sellers the system returns to step 404, asking if the next highest ranked seller's minimum quantity requirement is met by the remaining quantity required by the remaining buyers, and if the remaining buyers' maximum unit prices are less than the seller's bid price. If no remaining sellers are found, all unmatched buyers are notified 411. Finally, the system collects payments from the buyers and the sellers fulfill the orders for the buyers assigned to them.

The system also facilitates a method of offering buyers the option to accept a transaction at a seller's bid price which is closest to the buyer's offer price. For example, if a buyer offers to buy an item for $90.00, and the system receives a bid from a seller for $92.00, although the seller has not met the offer price, the system will inquire whether the buyer would like to buy the product (or service) at the bid price of $92.00.

The process of matching buyers and sellers in best illustrated with the following six examples; although, numerous other scenarios could occur:

Example 1

| Buyers | Quantity | Max. Unit Price ($) | Credit Card Good | Sellers | Unit Price ($) | Min. Quantity | Max. Quantity |
|---|---|---|---|---|---|---|---|
| Buyer 1 | 1 | 100 | Yes | A | 90 | 2 | 100 |
| Buyer 2 | 2 | 110 | Yes | B | 95 | 5 | 10 |
| Buyer 3 | 1 | 95 | Yes | C | 99 | 3 | 20 |
| Buyer 4 | 2 | 99 | Yes | D | 100 | 2 | 20 |
| Buyer 5 | 1 | 105 | Yes | | | | |

Example 1 Result after Matching

| Buyers | Quantity | Final Unit Price ($) | Sellers |
|---|---|---|---|
| Buyer 1 | 1 | 90 | A |
| Buyer 2 | 2 | 90 | A |
| Buyer 3 | 1 | 90 | A |
| Buyer 4 | 2 | 90 | A |
| Buyer 5 | 1 | 90 | A |

Explanation of Example 1

Looking at Example 1 in terms of the logic of FIG. 3 results in the following:

Step 401: All buyers with offering prices less than the lowest seller's bid price are excluded;

Step 402: Buyers are sequenced based on the chronology of their order;

Step 403: Sellers are then sequenced based on their bid price from lowest to highest;

Step 404: There are enough buyers (quantity) with offering prices higher than the highest ranked seller's (i.e. Seller A) bid price to meet Seller A's minimum quantity;

Step 406: Buyers are assigned to Seller A up to Seller A's maximum quantity;

Step 407: There are no remaining buyers;

Step 408: Notify all unmatched sellers;

Step 409: Notify all matched buyers and sellers.

Example 2

| Buyers | Quantity | Max. Unit Price ($) | Credit Card Good | Sellers | Unit Price ($) | Min. Quantity | Max. Quantity |
|---|---|---|---|---|---|---|---|
| Buyer 1 | 1 | 100 | Yes | A | 90 | 1 | 2 |
| Buyer 2 | 2 | 110 | Yes | B | 95 | 2 | 10 |
| Buyer 3 | 1 | 95 | Yes | C | 99 | 3 | 20 |
| Buyer 4 | 2 | 99 | Yes | D | 100 | 2 | 20 |
| Buyer 5 | 1 | 105 | Yes | | | | |

Example 2 Result after Matching

| Buyers | Quantity | Final Unit Price ($) | Sellers |
|---|---|---|---|
| Buyer 1 | 1 | 90 | A |
| Buyer 2 | 1 | 90 | A |
| Buyer 2 | 1 | 95 | B |
| Buyer 3 | 1 | 95 | B |
| Buyer 4 | 2 | 95 | B |
| Buyer 5 | 1 | 95 | B |

Explanation of Example 2

Looking at Example 2 in terms of the logic of FIG. 3 results in the following:

Step 401: All buyers with offering prices less than the lowest seller's bid price are excluded;
Step 402: Buyers are sequenced based on the chronology of their order;
Step 403: Sellers are then sequenced based on their bid price from lowest to highest;
Step 404: There are enough buyers (quantity) with offering prices higher than the highest ranked seller's (i.e. Seller A) bid price to meet Seller A's minimum quantity;
Step 406: Buyers are assigned to Seller A up to Seller A's maximum quantity;
Step 407: Unmatched buyer/quantity remains;
Step 410: There are remaining sellers;
Return to Step 404: There are enough buyers (quantity) with offering prices higher than the second ranked seller's (i.e. Seller B) bid price to meet Seller B's minimum quantity;
Step 405: Buyers are assigned to Seller B up to Seller B's maximum quantity;
Step 407: There are no remaining buyers;
Step 408: Notify all unmatched sellers;
Step 409: Notify all matched buyers and sellers.

Example 3

| Buyers | Quantity | Max. Unit Price ($) | Credit Card Good | Sellers | Unit Price ($) | Min. Quantity | Max. Quantity |
|---|---|---|---|---|---|---|---|
| Buyer 1 | 1 | 100 | Yes | A | 90 | 1 | 2 |
| Buyer 2 | 2 | 110 | No | B | 95 | 2 | 10 |
| Buyer 3 | 1 | 95 | Yes | C | 99 | 3 | 20 |
| Buyer 4 | 2 | 99 | Yes | D | 100 | 2 | 20 |
| Buyer 5 | 1 | 105 | Yes | | | | |

Example 3 Result after Matching

| Buyers | Quantity | Final Unit Price ($) | Sellers |
|---|---|---|---|
| Buyer 1 | 1 | 90 | A |
| Buyer 3 | 1 | 90 | A |
| Buyer 4 | 2 | 95 | B |
| Buyer 5 | 1 | 95 | B |

Explanation of Example 3

Looking at Example 3 in terms of the logic of FIG. 3 results in the following:

Step 401: All buyers with offering prices less than the lowest seller's bid price are excluded;
Step 402: Buyers are sequenced based on the chronology of their order. Buyer 2 has been omitted from the results since his credit card would not allow authorization of the escrow fee;
Step 403: Sellers are then sequenced based on their bid price from lowest to highest;
Step 404: There are enough buyers (quantity) with offering prices higher than the highest ranked seller's (i.e. Seller A) bid price to meet Seller A's minimum quantity;
Step 406: Buyers are assigned to Seller A up to Seller A's maximum quantity;
Step 407: Unmatched buyer/quantity remains;
Step 410: There are remaining sellers;
Return to Step 404: There are enough buyers (quantity) with offering prices higher than the second ranked seller's (i.e. Seller B) bid price to meet Seller B's minimum quantity;
Step 405: Buyers are assigned to Seller B up to Seller B's maximum quantity;
Step 407: There are no remaining buyers;
Step 408: Notify all unmatched sellers;
Step 409: Notify all matched buyers and sellers.

Example 4

| Buyers | Quantity | Max. Unit Price ($) | Credit Card Good | Sellers | Unit Price ($) | Min. Quantity | Max. Quantity |
|---|---|---|---|---|---|---|---|
| Buyer 1 | 1 | 100 | Yes | A | 90 | 1 | 2 |
| Buyer 2 | 2 | 110 | Yes | B | 95 | 20 | 50 |
| Buyer 3 | 1 | 99 | Yes | C | 99 | 3 | 20 |
| Buyer 4 | 2 | 99 | Yes | D | 100 | 2 | 20 |
| Buyer 5 | 1 | 105 | Yes | | | | |

Example 4 Result after Matching

| Buyers | Quantity | Final Unit Price ($) | Sellers |
|---|---|---|---|
| Buyer 1 | 1 | 90 | A |
| Buyer 2 | 1 | 90 | A |
| Buyer 2 | 1 | 99 | C |
| Buyer 3 | 1 | 99 | C |
| Buyer 4 | 2 | 99 | C |
| Buyer 5 | 1 | 99 | C |

Explanation of Example 4

Looking at Example 4 in terms of the logic of FIG. 3 results in the following:

Step 401: All buyers with offering prices less than the lowest seller's bid price are excluded;

Step 402: Buyers are sequenced based on the chronology of their order. Buyer 2 has been omitted from the results since his credit card would not allow authorization of the escrow fee;

Step 403: Sellers are then sequenced based on their bid price from lowest to highest;

Step 404: There are enough buyers (quantity) with offering prices higher than the highest ranked seller's (i.e. Seller A) bid price to meet Seller A's minimum quantity;

Step 406: Buyers are assigned to Seller A up to Seller A's maximum quantity;

Step 407: Unmatched buyer/quantity remains;

Step 410: There are remaining sellers;

Return to Step 404: There are enough buyers (quantity) with offering prices higher than the second ranked seller's (i.e. Seller B) bid price to meet Seller B's minimum quantity;

Step 406: Buyers are assigned to Seller B up to Seller B's maximum quantity;

Step 407: Unmatched buyer/quantity remains;

Step 410: There are remaining sellers;
Step 404: There are enough buyers (quantity) with offering prices higher than the third ranked seller's (i.e. Seller C) bid price to meet Seller C's minimum quantity;
Step 406: Buyers are assigned to Seller C up to Seller C's maximum quantity;
Step 407: There are no remaining buyers;
Step 408: Notify all unmatched sellers;
Step 409: Notify all matched buyers and sellers.

Example 5

| Buyers | Quantity | Max. Unit Price ($) | Credit Card Good | Sellers | Unit Price ($) | Min. Quantity | Max. Quantity |
|---|---|---|---|---|---|---|---|
| Buyer 1 | 1 | 100 | Yes | A | 90 | 1 | 2 |
| Buyer 2 | 2 | 80 | Yes | B | 95 | 2 | 50 |
| Buyer 3 | 1 | 95 | Yes | C | 99 | 3 | 20 |
| Buyer 4 | 2 | 99 | Yes | D | 100 | 2 | 20 |
| Buyer 5 | 1 | 105 | Yes | | | | |

Example 5 Result after Matching

| Buyers | Quantity | Final Unit Price ($) | Sellers |
|---|---|---|---|
| Buyer 1 | 1 | 90 | A |
| Buyer 3 | 1 | 90 | A |
| Buyer 4 | 2 | 95 | B |
| Buyer 5 | 1 | 95 | B |

Explanation of Example 5

Looking at Example 5 in terms of the logic of FIG. 3 results in the following:
Step 401: All buyers with offering prices less than the lowest seller's bid price are excluded (i.e. Buyer 2);
Step 402: Buyers are sequenced based on the chronology of their order;
Step 403: Sellers are then sequenced based on their bid price from lowest to highest;
Step 404: There are enough buyers (quantity) with offering prices higher than the highest ranked seller's (i.e. Seller A) bid price to meet Seller A's minimum quantity;
Step 406: Buyers are assigned to Seller A up to Seller A's maximum quantity;
Step 407: Unmatched buyer/quantity remains;

Step 410: There are remaining sellers;
Return to Step 404: There are enough buyers (quantity) with offering prices higher than the second ranked seller's (i.e. Seller B) bid price to meet Seller B's minimum quantity.
Step 406: Buyers are assigned to Seller B up to Seller B's maximum quantity;
Step 407: There are no remaining buyers;
Step 408: Notify all unmatched sellers;
Step 409: Notify all matched buyers and sellers.

Step 407: Unmatched buyer/quantity remains;
Step 410: There are remaining sellers;
Return to Step 404: There are enough buyers (quantity) with offering prices higher than the fourth ranked seller's (i.e. Seller D) bid price to meet Seller D's minimum quantity;
Step 406: Buyers are assigned to Seller D up to Seller D's maximum quantity;
Step 407: Unmatched buyer/quantity remains;
Step 410: There are remaining no remaining sellers;
Step 408: Notify all unmatched sellers;
Step 409: Notify all matched buyers and sellers;
Step 411: Notify all unmatched buyers.

Example 6

| Buyers | Quantity | Max. Unit Price ($) | Credit Card Good | Sellers | Unit Price ($) | Min. Quantity | Max. Quantity |
|---|---|---|---|---|---|---|---|
| Buyer 1 | 1 | 100 | Yes | A | 90 | 1 | 2 |
| Buyer 2 | 3 | 98 | Yes | B | 95 | 2 | 5 |
| Buyer 3 | 15 | 100 | Yes | C | 99 | 3 | 5 |
| Buyer 4 | 2 | 99 | Yes | D | 100 | 2 | 3 |
| Buyer 5 | 10 | 105 | Yes | | | | |

Example 6 Result after Matching

| Buyers | Quantity | Final Unit Price ($) | Sellers |
|---|---|---|---|
| Buyer 1 | 1 | 90 | A |
| Buyer 2 | 1 | 90 | A |
| Buyer 2 | 2 | 95 | B |
| Buyer 3 | 3 | 95 | B |
| Buyer 3 | 5 | 99 | C |
| Buyer 3 | 3 | 100 | D |

Explanation of Example 6

Looking at Example 6 in terms of the logic of FIG. 3 results in the following:
Step 401: All buyers with offering prices less than the lowest seller's bid price are excluded;
Step 402: Buyers are sequenced based on the chronology of their order;
Step 403: Sellers are then sequenced based on their bid price from lowest to highest;
Step 404: There are enough buyers (quantity) with offering prices higher than the highest ranked seller's (i.e. Seller A) bid price to meet Seller A's minimum quantity;
Step 406: Buyers are assigned to Seller A up to Seller A's maximum quantity;
Step 407: Unmatched buyer/quantity remains;
Step 410: There are remaining sellers;
Return to Step 404: There are enough buyers (quantity) with offering prices higher than the second ranked seller's (i.e. Seller B) bid price to meet Seller B's minimum quantity.
Step 406: Buyers are assigned to Seller B up to Seller B's maximum quantity;
Step 407: Unmatched buyer/quantity remains;
Step 410: There are remaining sellers:
Return to Step 404: There are enough buyers (quantity) with offering prices higher than the third ranked seller's (i.e. Seller C) bid price to meet Seller C's minimum quantity;
Step 406: Buyers are assigned to Seller C up to Seller C's maximum quantity;

Also available under an embodiment of the present invention is the ability for an individual buyer to place a limit order, in which a buyer commits to buying a certain item at a certain price. There is no bidding from sellers under this scenario. A buyer simply sets the unit price he is willing to pay, and whichever sellers accepts the buyer's unit price gets the sale.

It is to be appreciated that the lure to many consumers is the thrill of winning an auction, not unlike the thrill of a gambler experience upon hitting the jackpot. The present invention is structured to encourage both the buyer and the seller to review his status frequently as minor changes in the number of buyers or in the sellers prices/quantities may have global effects because of how the system ranks sellers, ranks buyers, and then matches buyers with sellers. In essence the auction functions to a large degree as a sealed auction for the number of items sold and at what prices and can fluctuate wildly (up or down) until the auction is closed. The system has the potential to produce unexpected results. For example, one hundred people may be poised to each receive a television at below their maximum unit price from Seller A, who has a minimum quantity of one hundred. However, if just one additional seller bids below Seller A, but only has a small quantity available, for example five televisions, only the first five buyers will receive televisions, while the remaining ninety-five will receive nothing.

It is to be understood that the invention is not limited in its application to the details of construction and to the arrangements of the components set forth in the preceding description or illustrated in the drawings. The invention is capable of other embodiments and of being practiced and carried out in various ways. Also, it is to be understood that the phraseology and terminology employed herein are for the purpose of descriptions and should not be regarded as limiting.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. A system for facilitating a sales transaction for purchasing a retail service by a group of buyers from at least one seller over an electronic network comprising a processor configured to execute the steps of:
   a. receiving into the system a request to buy a product by a buyer that specifies type of said product, a maximum unit price for said product, the quantity of said product requested, and buyer's billing information;
   b. forming a buying group with buyers having substantially similar purchase characteristics;
   c. qualifying said buyer for entry into said buying group;
   d. establishing a buyer's escrow fee amount, of which said buyers must agree to pay if he fails to fulfill his commitment;
   e. receiving into the system a seller's information for a seller to qualify to submit bids;
   f. establishing a seller's escrow fee amount, of which said seller must agree to pay if he fails to fulfill his commitment;
   g. conducting a reverse auction cycle wherein a seller transmits into said system a bid to sell a product to said buying group wherein said bid includes the minimum selling price, the minimum quantity of units for sale and the maximum quantity of units for sale;
   h. matching buyers with a seller via a matching process when the number of products requested by buyers having a maximum unit price that exceeds said seller's minimum selling price and exceeds said seller's minimum quantity of units for sale, after said auction closes, via the following steps;
      1. ranking said buyers chronologically;
      2. ranking said sellers based on said unit price from lowest to highest;
      3. inquiring if there are enough said buyers with offering prices higher than said seller's bid unit price to meet said seller's minimum quantity requirements;
      4. assigning said buyers by rank up to the seller's maximum quantity at said seller's bid unit price if there is enough buyers with offering prices higher than seller's bid unit price to meet said seller's minimum quantity requirements;
      5. skipping said seller and moving to the next ranked seller, if there is not enough of said buyers with offering prices higher than said seller's bid unit price to meet said seller's minimum quantity requirements;
      6. repeating said matching process until no buyers or sellers remain; and
      7. notifying all matched and unmatched buyers and sellers.

2. A system for facilitating a sales transaction for purchasing a product by a group of buyers from at least one seller over an electronic network comprising a processor configured to execute the steps of:
   a. receiving into the system a request to buy a product by a buyer that specifies type of said product, a maximum unit price for said product, the quantity of said product requested, and buyer's billing information;
   b. forming a buying group with buyers having substantially similar purchase characteristics;
   c. qualifying said buyer for entry into said buying group;
   d. establishing a buyer's escrow fee amount, of which said buyers must agree to pay if he fails to fulfill his commitment;
   e. receiving into the system a seller's information for a seller to qualify to submit bids;
   f. establishing a seller's escrow fee amount, of which said seller must agree to pay if he fails to fulfill his commitment;
   g. conducting a reverse auction cycle wherein a seller transmits into said system a bid to sell a product to said buying group wherein said bid includes the minimum selling price, the minimum quantity of units for sale and the maximum quantity of units for sale;
   h. matching buyers with a seller through a matching process after said reverse auction cycle closes via the following steps;
      1. ranking said buyers chronologically;
      2. ranking said sellers based on said unit price from lowest to highest;
      3. inquiring if there are enough said buyers with offering prices higher than said seller's bid unit price to meet said seller's minimum quantity requirements;
      4. assigning said buyers by rank up to the seller's maximum quantity at said seller's bid unit price if there is enough buyers with offering prices higher than seller's bid unit price to meet said seller's minimum quantity requirements;
      5. skipping said seller and moving to the next ranked seller, if there is not enough of said buyers with offering prices higher than said seller's bid unit price to meet said seller's minimum quantity requirements;
      6. repeating said matching process until no buyers or sellers remain; and
      7. notifying all matched and unmatched buyers and sellers.

* * * * *